US012567419B2

(12) United States Patent (10) Patent No.: US 12,567,419 B2

Talwar et al. (45) Date of Patent: Mar. 3, 2026

(54) VOICEPRINT DRIFT DETECTION AND UPDATE

(71) Applicant: GM GLOBAL TECHNOLOGY OPERATIONS LLC, Detroit, MI (US)

(72) Inventors: Gaurav Talwar, Novi, MI (US); Alaa M. Khamis, Courtice (CA); Xu Fang Zhao, LaSalle (CA); Kenneth R. Booker, Grosse Pointe Woods, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 354 days.

(21) Appl. No.: 18/303,754

(22) Filed: Apr. 20, 2023

(65) Prior Publication Data

US 2024/0355332 A1 Oct. 24, 2024

(51) Int. Cl.
G10L 17/04 (2013.01)
G10L 17/06 (2013.01)
G10L 17/22 (2013.01)
G10L 17/26 (2013.01)

(52) U.S. Cl.
CPC .............. G10L 17/04 (2013.01); G10L 17/06 (2013.01); G10L 17/22 (2013.01)

(58) Field of Classification Search
CPC ......... G10L 17/04; G10L 17/06; G10L 17/22; G10L 17/26
See application file for complete search history.

(56) References Cited

U.S. PATENT DOCUMENTS

| | | | | | |
|---|---|---|---|---|---|
| 12,488,072 | B2 * | 12/2025 | Khoury | ................. | G06N 20/00 |
| 2017/0140760 | A1 * | 5/2017 | Sachdev | ................. | G10L 17/02 |
| 2021/0390959 | A1 * | 12/2021 | Jain | ..................... | A61B 5/7267 |

FOREIGN PATENT DOCUMENTS

| | | | | | |
|---|---|---|---|---|---|
| CN | 106157959 A | * | 11/2016 | ............. | G06F 21/32 |
| CN | 106782564 A | * | 5/2017 | ....... | G06F 18/23213 |
| CN | 107086983 A | * | 8/2017 | ......... | H04L 63/0815 |
| CN | 110660398 A | * | 1/2020 | ............. | G10L 17/04 |
| CN | 110660399 A | * | 1/2020 | ............. | G10L 17/02 |
| CN | 111344783 A | * | 6/2020 | ............. | G06F 18/22 |
| CN | 115910072 A | * | 4/2023 | ............. | G06F 21/32 |
| EP | 1739546 A2 | * | 1/2007 | ....... | G08G 1/096775 |
| EP | 3996390 A1 | * | 5/2022 | ............. | G10L 17/08 |

* cited by examiner

*Primary Examiner* — Paras D Shah
*Assistant Examiner* — Mulugeta Tuji Dugda
(74) *Attorney, Agent, or Firm* — Quinn IP Law

(57) ABSTRACT

A voiceprint module for in-vehicle voiceprint drift detection. The module may be configured for determining an archived voiceprint for an operator of a vehicle, generating a first real-time voiceprint according to in-vehicle utterances of the operator made while operating the vehicle, generating a first voiceprint deviation to quantify statistical distance between one or more probabilistic density functions associated with each of the first real-time and archived voiceprints, and updating one or more vocal characteristics of the archived voiceprint to generate an updated voiceprint in response to the first voiceprint deviation surpassing an update threshold.

20 Claims, 4 Drawing Sheets

VOICEPRINT DRIFT DETECTION AND UPDATE

INTRODUCTION

The present disclosure relates to updating voiceprints of the type suitable for use with voice biometric engines, such as but not necessarily limited to updating voiceprints to account for detected vocal drift.

A voiceprint, which may also be referred to as voice signature or vocal biometric, may be generated to characterize a plurality of vocal characteristics of an associated individual. Because a voiceprint may be unique to the associated individual, it may be employed with voice biometric engines to distinguish one individual from another and/or to facilitate speech recognition related activities. As an individual ages, physically changes, experiences health issues, or otherwise naturally develops, the voiceprint of the individual may correspondingly change. The changes, variation, etc. in the vocal characteristics of an individual may be referred to as drift. The vocal characteristics of an individual may correspondingly evolve over time such that the vocal characteristics at an earlier point in time may vary from the vocal characteristics of the individual at a later period of time, i.e., the vocal characteristics may drift.

The ability of voice biometric engines to recognize speech may be dependent on using a voiceprint that accurately reflects the current or real-time vocal characteristics of the associated individual. In the past, voice biometric engines have attempted to combat inaccuracies resulting from vocal drift by periodically requesting individuals to rebuild their voiceprint, i.e., to create an entirely new voiceprint. The time and effort taken to rebuild a voiceprint may be problematic and onerous for the individuals as it may require the individuals to repeatedly engage in time-consuming voice recognition processes.

SUMMARY

One non-limiting aspect of the present disclosure relates to a voiceprint module configured for updating voiceprints to account for vocal drift, such as but not necessarily limited to updating voiceprints to account for drift in real-time or before requiring individuals to undertake time-consuming voice recognition processes.

One non-limiting aspect of the present disclosure relates to a method for in-vehicle voiceprint drift detection. The method may include determining an archived voiceprint for an operator of a vehicle, generating a real-time voiceprint for the operator according to in-vehicle utterances made by the operator while operating the vehicle, and generating a voiceprint deviation to probabilistically quantify drift between the real-time and archived voiceprints. The drift may reflect statistical distance between one or more probabilistic density functions associated with each of the real-time and archived voiceprints. The method may further include generating a rebuilt voiceprint in response to the voiceprint deviation surpassing a rebuild threshold and generating an updated voiceprint in response to the voiceprint deviation surpassing an update threshold. The update threshold may be less than the rebuild threshold.

The method may include performing an update process to generate the updated voiceprint, the update process generating the updated voiceprint according to one or more adjustments made to the archived voiceprint.

The method may include performing an update process to generate the updated voiceprint by statistically altering the archived voiceprint.

The method may include performing an update process to generate the updated voiceprint by altering one or more of vocal characteristics of the archived voiceprint.

The method may include the vocal characteristics including one or more of pitch, intensity, amplitude, formants, spectrogram, Mel-frequency cepstral coefficients (MFCCs), timing, timbre, accent, dialect, and intonation.

The method may include performing a rebuild process to generate the rebuilt voiceprint according to test utterances made by the operator as part of a verbal test.

The method may include performing a rebuild process to generate the rebuilt voiceprint according to a combination of words spoken by the operator and recorded with an acoustics module onboard the vehicle.

One non-limiting aspect of the present disclosure relates to a system for in-vehicle voiceprint drift detection. The system may include an acoustics module configured for controlling one or more operations of a vehicle according to in-vehicle utterances of an operator made while operating the vehicle. The system may further include a voiceprint module configured for generating a real-time voiceprint according to the in-vehicle utterances, generating a voiceprint deviation to probabilistically quantify drift between the real-time voiceprint and an archived voiceprint previously generated for the operator, and updating one or more vocal characteristics of the archived voiceprint to generate an updated voiceprint in response to the voiceprint deviation surpassing an update threshold.

The voiceprint module may be configured for updating the vocal characteristics according to a statistical process whereby the updated voiceprint is generated by statistically altering the archived voiceprint in proportion to the voiceprint deviation.

The vocal characteristics may include one or more of pitch, intensity, amplitudes, formants, spectrogram, Mel-frequency cepstral coefficients (MFCCs), timing, timbre, accent, dialect, and intonation.

The voiceprint module may be configured for generating an archived probability distribution to model vocal-tract frequency spectra for the archived voiceprint, generating a real-time probability distribution to model vocal-tract frequency spectra for the real-time voiceprint, and generating the voiceprint deviation according to differences between the archived and real-time probability distributions.

The drift may reflect statistical distance between one or more probabilistic density functions associated with each of the real-time and archived voiceprints.

The acoustics module may be onboard the vehicle, and the voiceprint module may be offboard the vehicle at a back office controller.

The voiceprint module may be configured for replacing the archived voiceprint with a rebuilt voiceprint in response to the voiceprint deviation surpassing a rebuild threshold.

The voiceprint module may be configured for generating the rebuilt voiceprint according to test utterances made by the operator in response to a plurality of verbal test questions.

One non-limiting aspect of the present disclosure relates to a voiceprint module for in-vehicle voiceprint drift detection. The module may be configured for determining an archived voiceprint for an operator of a vehicle, generating a first real-time voiceprint according to in-vehicle utterances of the operator made while operating the vehicle, generating a first voiceprint deviation to quantify statistical distance between one or more probabilistic density functions associated with each of the first real-time and archived voiceprints, and updating one or more vocal characteristics of the archived voiceprint to generate an updated voiceprint in response to the first voiceprint deviation surpassing an update threshold.

The voiceprint module may be configured for updating the vocal characteristics according to a statistical process whereby the updated voiceprint is generated by statistically altering the archived voiceprint in proportion to the first voiceprint deviation.

The voiceprint module may be configured for generating a second real-time voiceprint according to further in-vehicle utterances of the operator made while operating the vehicle, generating a second voiceprint deviation to quantify statistical distance between one or more probabilistic density functions associated with each of the updated and second real-time voiceprints, and generating a rebuilt voiceprint in response to the second voiceprint deviation surpassing a rebuild threshold, the rebuild threshold being greater than the update threshold.

The voiceprint module may be configured for generating the rebuilt voiceprint according to test utterances made by the operator in response to a plurality of verbal test questions.

The voiceprint module may be configured for generating the updated voiceprint without performing the verbal test.

These features and advantages, along with other features and advantages of the present teachings, are readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
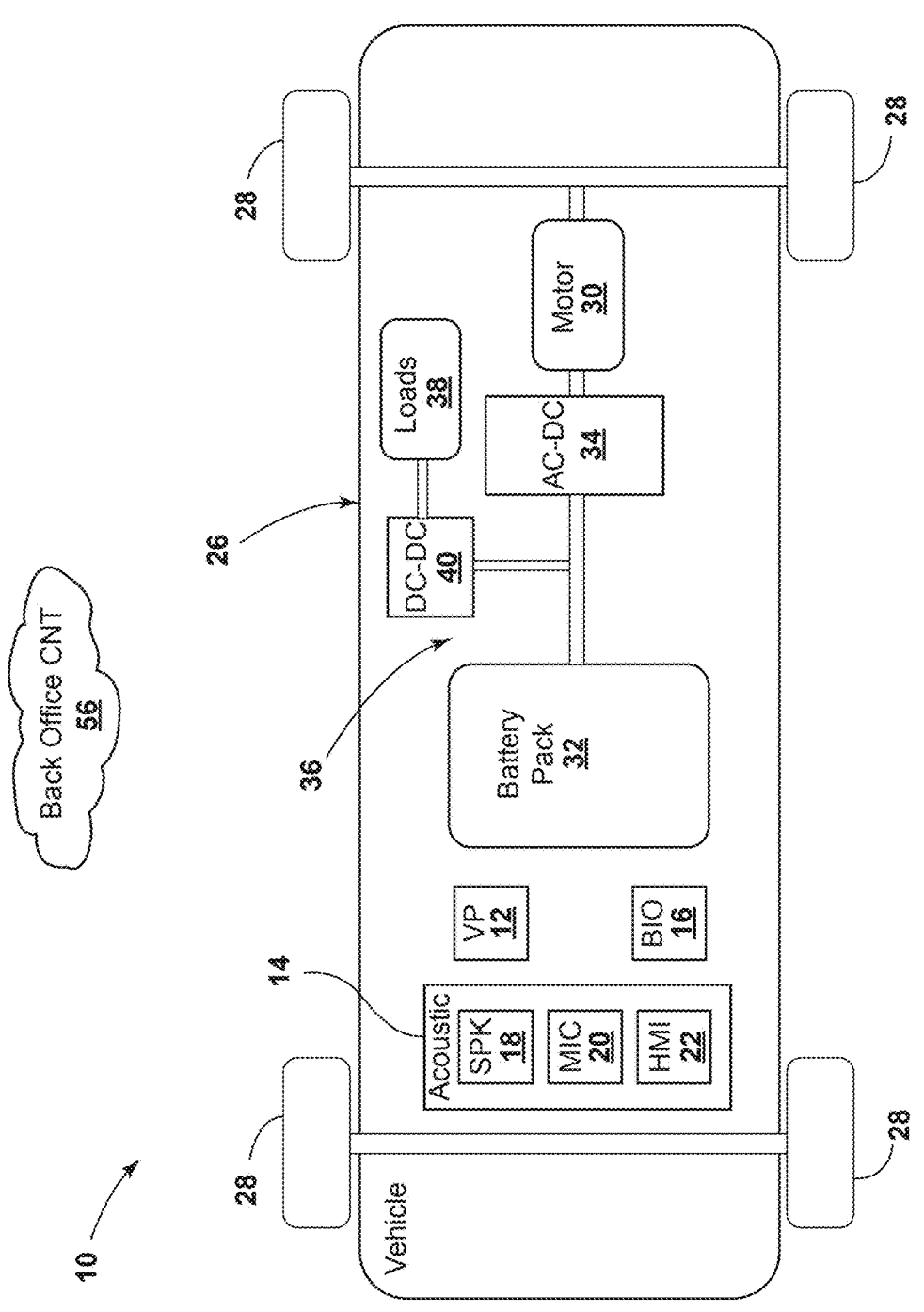
FIG. 1 illustrates a voiceprint drift detection system in accordance with one non-limiting aspect of the present disclosure.

FIG. 1 illustrates a voiceprint drift detection system 10 in accordance with one non-limiting aspect of the present disclosure. The voiceprint drift detection system 10 may include a voiceprint module 12, an acoustic module 14, a voice biometric engine 16, a speaker 18, a microphone 20, a human-machine interface (HMI) 22, and optionally additional devices to support the verbal and non-verbal interactions contemplated herein. The voiceprint drift detection system 10 is predominantly described with respect to being configured for use within a vehicle 26, such as but not necessarily limited to the illustrated automobile, however, the present disclosure fully contemplates the voiceprint drift detection system 10 being operable with and beneficial for other types of vehicles and/or devices. The voiceprint detection system 10 may be configured for generating, maintaining, updating, rebuilding, and otherwise processing voiceprints for a plurality of individuals. The voiceprints may be operable with the voice biometric engine 16 for recognizing or differentiating individuals according to their voice, providing speech recognition activities, and similar voice-dependent services and processes, such as but not necessarily limited to converting verbal commands to vehicle commands sufficient for controlling or directing operation of various systems included onboard the vehicle.

The vehicle 26 is illustrated for non-limiting purposes as including a plurality of wheels 28 capable of being driven with an electric motor 30, such as with electrical power provided from a battery pack 32 and converted with an AC-DC converter 34. An electrical power distribution system 36 may be included for distributing electrical power between the battery pack 32 and additional loads 38 onboard the vehicle via a DC-to DC converter 40. The vehicle 26 may be considered as an electric vehicle, however, the present disclosure fully contemplates the voiceprint drift detection system 10 being operable with internal combustion engine (ICE) and other types of vehicles and devices having other componentry. The illustrated configuration is believed to be particularly beneficial for use with the voiceprint drift detection system 10 due to the enhanced capabilities of the present disclosure to accurately provide and manage in real-time voiceprints for vehicle occupants, and thereby provide improved voice or speech recognition-based control of the wide range of electrical controllable systems and subsystems becoming more prevalent onboard more sophisticated and complex types of vehicles, like electric vehicles.

Figure 2:
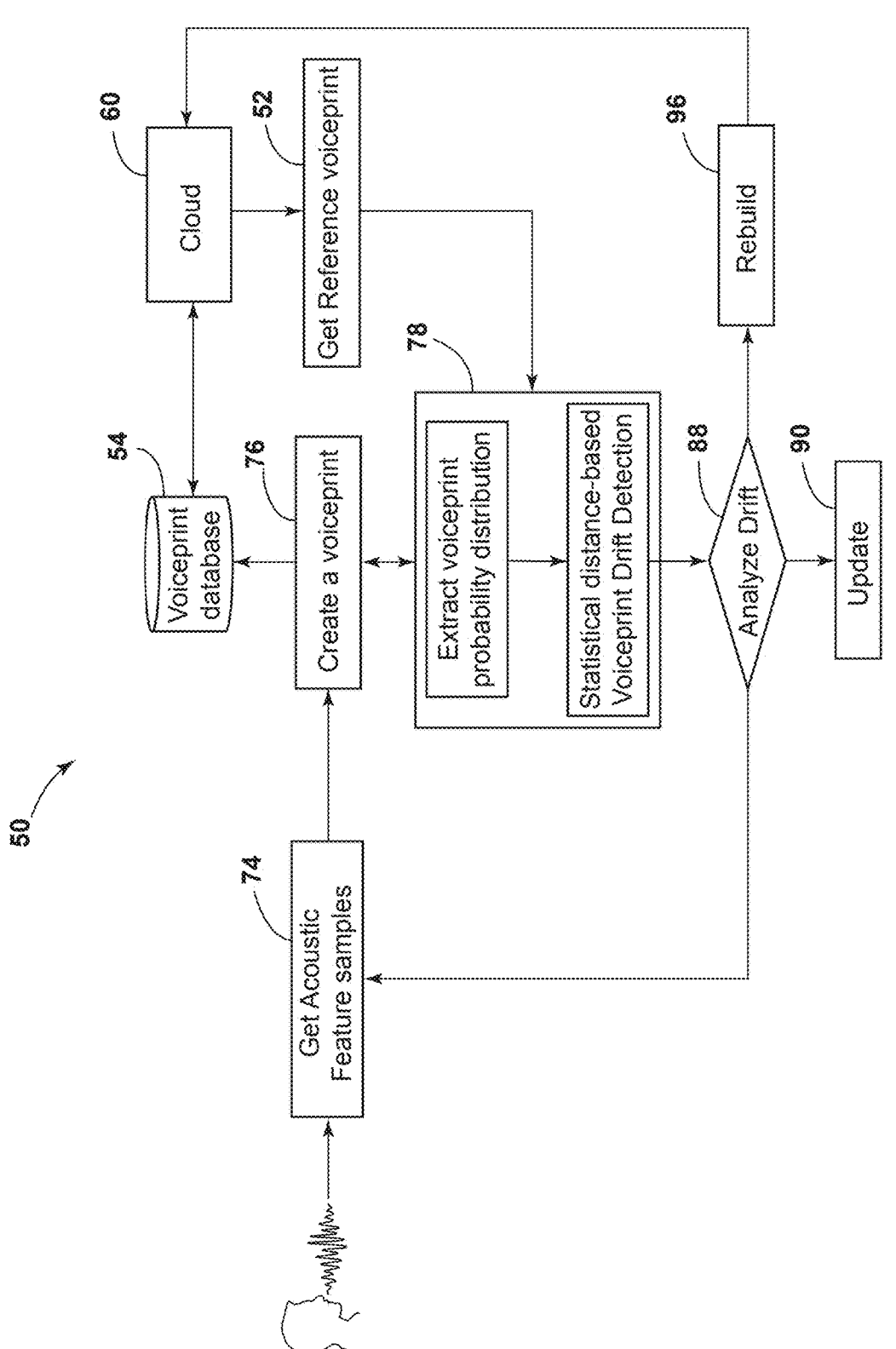
FIG. 2 illustrates a flowchart of a method for voiceprint drift detection in accordance with one non-limiting aspect of the present disclosure.

FIG. 2 illustrates a flowchart 50 of a method for voiceprint drift detection in accordance with one non-limiting aspect of the present disclosure. The method is predominantly described with respect to facilitating voiceprint management within a vehicle, such as but not necessarily limited to the above-described electric vehicle 26. The acoustics module 14, the voiceprint module 12, and/or one or more of the additional devices or systems included within the vehicle may perform one or more of the processes described herein to assist in supporting the voiceprint drift detection. The described method may optionally be performed according to an associated processor executing one or more of a plurality of non-transitory instructions stored on a corresponding computer-readable storage medium. One non-limiting aspect of the present disclosure relates to a method for updating voiceprints of the type used with the voice biometric engine 16 to account for vocal drift, such as but not necessarily limited to updating voiceprints to account for drift detected in real-time, e.g., before requiring individuals to undertake time-consuming voice recognition processes to account for drift.

Block 52 relates to an archival retrieval process for retrieving voiceprints previously archived for one or more occupants within the vehicle. For the sake of presentation simplicity, and without limitation, the method is predominately presented with respect to a singular occupant, however, the methodologies and processes described herein may be similarly advantageous in supporting voiceprints for multiple occupants, optionally simultaneously or in concert with each other. The voiceprint module 12 may be configured for retrieving the archived voiceprint from a storage medium 54 included onboard the vehicle 26 and/or through wireless communications with an entity offboard the vehicle 26, like a back-office controller 56 illustrated in FIG. 1. The archived voiceprint may correspond with a voiceprint previously generated for the occupant by the voiceprint module 12 and/or obtained from the source offboard the vehicle, such as in response to the back-office controller 56 registering or otherwise creating the archived voiceprint for the occupant through a personalized cloud profile process 60. The archived voiceprint may be a current or active voiceprint currently employed by the voice biometric engine 16 for speech recognition and its other operations. The archived voiceprint may be selected based on an identification determined for the occupant by the voiceprint module 12 or another module included onboard the vehicle, such as in response to the voice biometric engine 16 identifying the occupant from in-vehicle utterances made by the occupant while operating or otherwise speaking within the vehicle.

Figure 3:
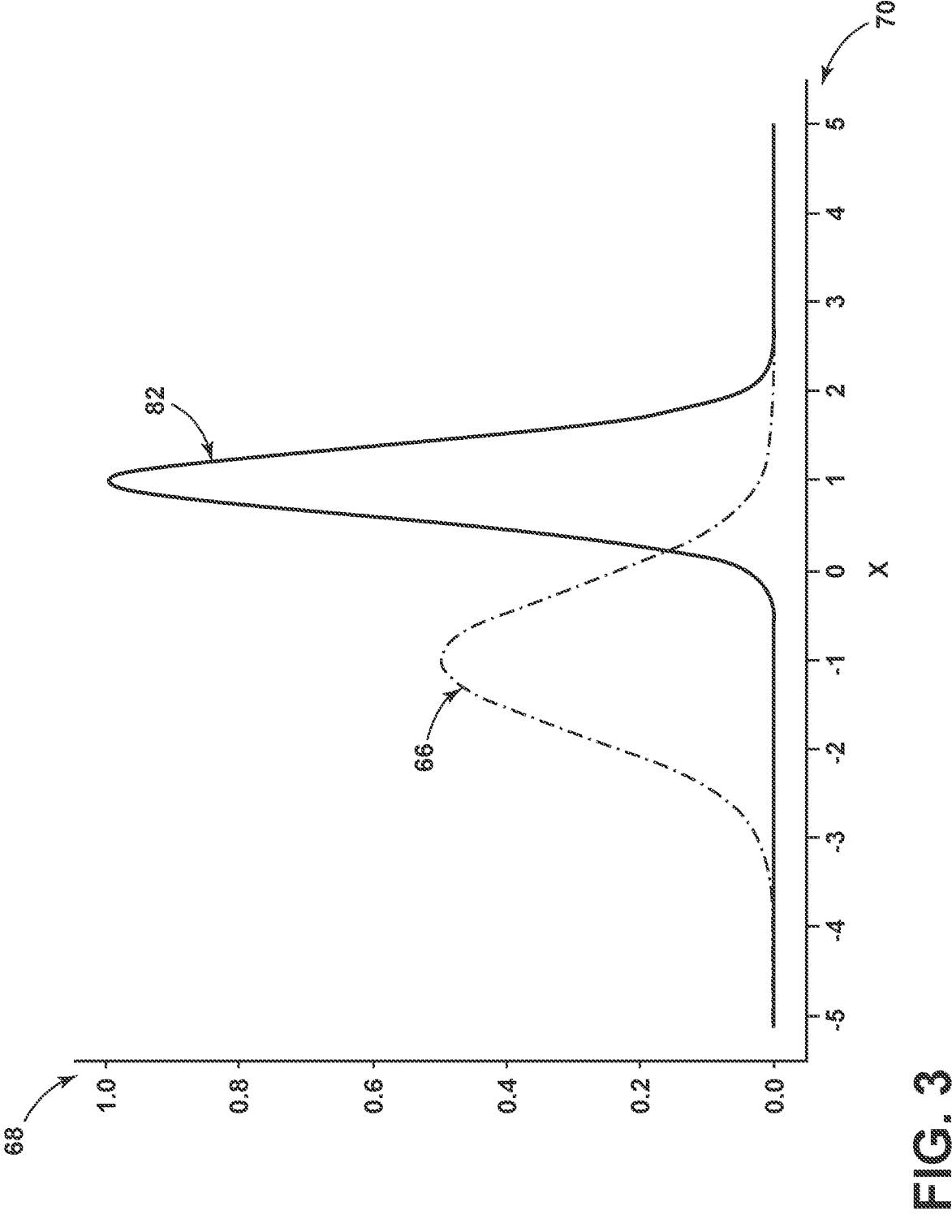
FIG. 3 illustrates a diagram of an archived voiceprint in accordance with one non-limiting aspect of the present disclosure.

FIG. 3 illustrates a diagram of the archived voiceprint in accordance with one non-limiting aspect of the present disclosure. The archived voiceprint may be comprised of a plurality of vocal characteristics. The vocal characteristics may be represented according to an archived voiceprint curve 66, which may be a mathematical representation of vocal-tract frequency spectra previously measured for the associated occupant. The mathematical representation may correspond with a plurality of probabilistic density functions providing a probability distribution of the vocal characteristics for the archived voiceprint. A vertical axis 68 may represent probability for a dataset associated with a horizontal axis 70. The horizontal axis 70 may represent probabilistic density functions generated for an associated one or more of the vocal characteristics. The vocal characteristics may correspond with one or more of pitch, intensity, amplitude, formants, spectrogram, Mel-frequency cepstral coefficients (MFCCs), timing, timbre, accent, dialect, and intonation. The diagram illustrates a singular curve 66 for the archived voiceprint for illustrative purposes as additional curves may be included for one or more of the vocal characteristics and/or the vocal characteristics may be normalized and averaged, weighted, or otherwise combined for into a singular curve.

Returning to FIG. 2, Block 74 relates to a collection process whereby the acoustics module may be configured for sampling, measuring, or otherwise attaining a plurality of in-vehicle utterances made by the occupant, such as with the microphone 20. The in-vehicle utterances may correspond with verbal commands issued by the occupant to facilitate controlling one or more aspects or subsystems onboard the vehicle 26, speech or dialogue between occupant and additional occupants, or other utterances made within the vehicle 26 by the occupant. While the present disclosure contemplates sampling or otherwise attaining measurements of the occupant vocal characteristics from other sources, such as a mobile phone or other device offboard the vehicle, the use of the acoustics module 14 onboard the vehicle to obtain the in-vehicle utterances may be beneficial in more accurately representing vocal characteristics for the occupant when speaking within the vehicle 26. The vehicle 26 may experience background noise, reverberations, and other unique acoustical influences that may result in the in-vehicle utterances being more accurately reflective of vocal characteristics for the occupant when within the vehicle 26 than if the utterance were collected outside of the vehicle, which may be helpful in maximizing capabilities of the voice biometric engine 16.

The in-vehicle utterances may be obtained in an unobtrusive manner, optionally without the occupant being prompted or otherwise requested to undertake the onerous task of having to recite a predefined combination of words. The in-vehicle utterances, as such, may be considered as utterances typically undertaken by the occupant while normally operating the vehicle, as opposed to those made for purposes of newly creating a voiceprint. Block 76 relates to a real-time process for generating a real-time voiceprint for the occupant based on the in-vehicle utterances determined as part of the collection process. The real-time voiceprint may be generated in real-time or after a sufficient quantity of in-vehicle utterances have been detected over a predefined period of time to represent a current state of vocal characteristics for the occupant. The real-time voiceprint may be distinguished from the archived voiceprint in that the archived voiceprint may be generated intentionally after analyzing a particular combination of words spoken by the occupant, such as in response to a verbal test. The real-time voiceprint, in contrast, may be generated unobtrusively in in the background, and optionally without the occupant may be aware of its generation.

Block 78 relates to a deviation process for generating a voiceprint deviation. The voiceprint deviation may be used to probabilistically quantify vocal drift between the real-time voiceprint and the archived voiceprint. The drift may be reflected based on statistical distance between one or more probabilistic density functions associated with each of the real-time and archived voiceprints, i.e., common to both of the archived and real-time voiceprints. Returning to FIG. 3, one statistical distance may be represented for exemplary purposes to correspond with a first delta 80 between a population mean of the archived voiceprint curve 66 and a real-time voiceprint curve 82 of the real-time voiceprint, optionally with another statistical distance represented with a second delta 84 between a population variance of the archived and real-time voiceprint curves 66, 82. The deltas 80, 84 may be taken relative to other points of the curves 66, 82 and/or according to other methods of measuring statistical distance. Additional statistical distances may be similarly included and/or other methodologies may be employed to measure or otherwise quantify drift, or more specifically, regulating the vocal drift according to differences between the archived and real-time voiceprint curves 66, 82. The curves 66, 82 illustrated in FIG. 3, importantly, are merely representatives of those that may be generated according to a variety of probabilistic density function, and as such, are non-limiting.

Returning to FIG. 2, Block 88 relates to a drift analysis process for analyzing whether the voiceprint deviation used to measure the vocal drift is of a degree requiring corrective action. One non-limiting aspect of the present disclosure contemplates comparing the voiceprint deviation to a threshold, or multiple thresholds, to determine whether the archived voiceprint may continue to be used with the voice biometric engine 16 or whether the archived voiceprint should be replaced. Block 74 may be returned to in the event the voiceprint deviation is below an update threshold such that the voice biometric engine 16 may continue to rely upon the archived voiceprint for purposes of its operation. Block 90 may relate to an update process for updating the archived voiceprint to account for the vocal drift in response to the voiceprint deviation being greater than or equal to the update threshold and less than a rebuild threshold. The update process may correspond with a statistical manipulation whereby one or more of the vocal characteristics within the archived voiceprint may be adjusted. The adjustment may occur in the background and without requiring the occupant to speak a particular combination of words or otherwise undertake a verbal test.

Figure 4:
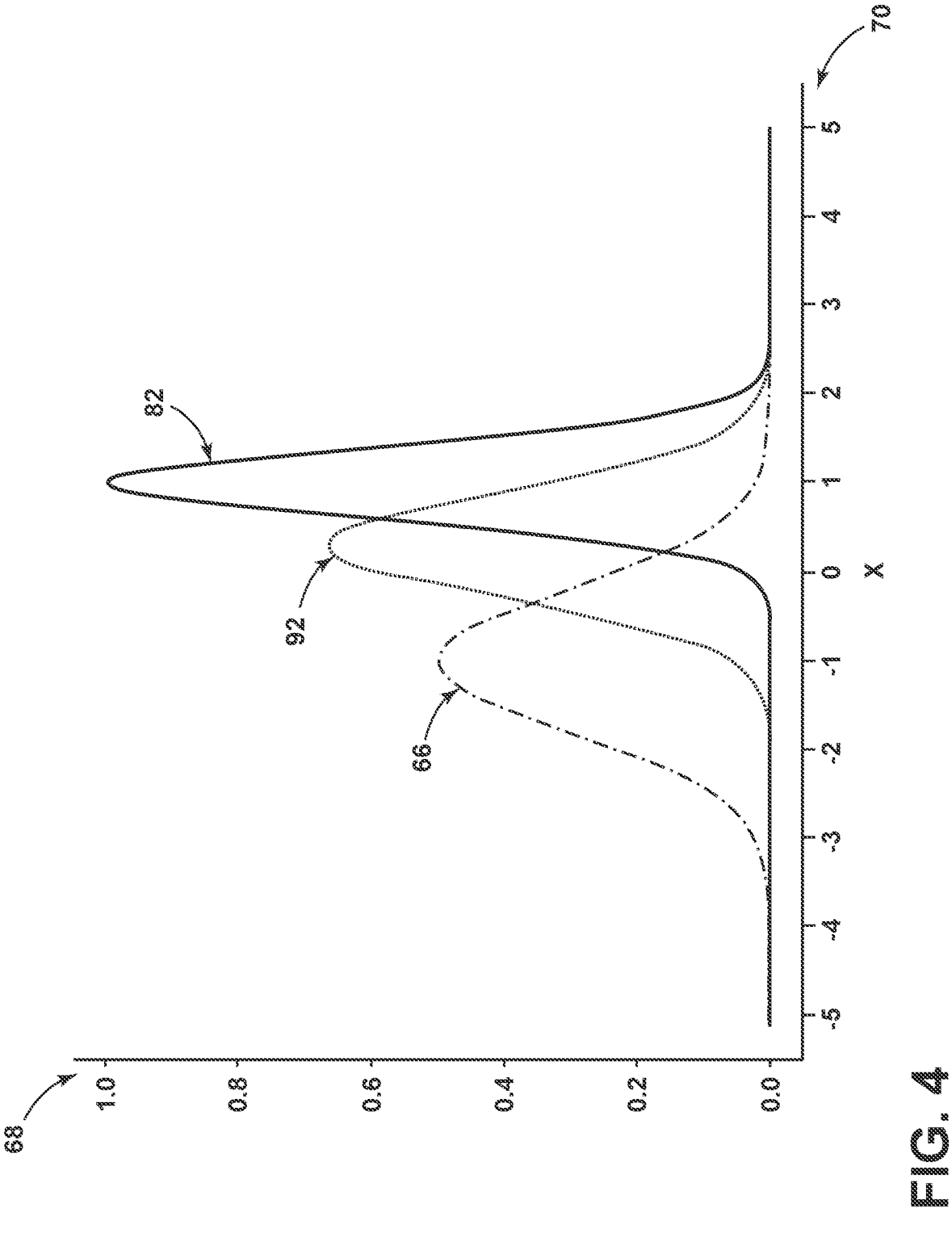
FIG. 4 illustrates a diagram of an updated voiceprint in accordance with one non-limiting aspect of the present disclosure.

FIG. 4 illustrates a diagram of an updated voiceprint in accordance with one non-limiting aspect of the present disclosure. The updated voiceprint may correspond with an updated voiceprint curve 92 generated based on statistical processing of the archived and real-time voiceprint curves 66, 82, relative to axis 68, 70. The updated voiceprint curve 92 is shown for exemplary and non-limiting purposes to correspond with statistical processing of the type whereby adjustments of the vocal characteristics may be made according to weighted averages assigned or otherwise determined for the associated probabilistic density functions. The updated voiceprint may be provided thereafter from the voiceprint module 12 to the voice biometric engine 16 whereupon the voice biometric engine 16 may replace the archived voiceprint previously in use with the updated voiceprint. Advantageously, the use of the updated voiceprint in place of the previously used archived voiceprint may occur in an unobtrusive manner and/or without the occupant being aware of the update. This may be beneficial in allowing the voiceprint currently being used within the vehicle 26 to be altered to account for vocal drift of the occupant without the occupant having to undertake owners or time-consuming processes, e.g., the update may occur based on in-vehicle utterances the occupant made in the normal course of operating the vehicle.

Returning to FIG. 2, Block 96 may relate to a rebuild process for rebuilding an entirely new voiceprint for the occupant in response to the voiceprint deviation being greater than or equal to the rebuild threshold. The rebuild process may correspond with the voiceprint module 12 controlling the acoustics module 14 to facilitate the occupant undertaking a vocal test. The vocal test may correspond with requesting the occupant to speak a predefined combination of words, which optionally may correspond with a combination of words previously utilized to generate the archived voiceprint retrieved in Block 52. The rebuild process may be differentiated from the update process in that the update process may occur without requesting the occupant to speak a certain set of words or to undertake activities beyond that which the operator occupant would normally perform when operating the vehicle 26, whereas the rebuild process may correspond with a more onerous time-consuming process whereby occupant interaction may be required and directed to occur according to a particular sequence of a vocal test.

As supported of above, the present disclosure relates to making use of voice biometrics in an automotive environment that may be a challenging problem owing to the presence of challenging noise and far field microphone acoustics. A hybrid architecture may be used in accordance with the present disclosure to facilitate optimal performance of the vehicle in light of occupant vocal drift. The present disclosure may include a system and a method to detect the voiceprint drift and to trigger a voiceprint update or rebuild. The drift detection may be based on statistical distance-based voiceprint drift between the constructed voiceprint probability distributions that represent the current voiceprint and a referenced or archived voiceprint. The present disclosure may provide a method for automatic update of voiceprints. Since the user frequently interacts with the vehicle using speech modality, the system can persistently or periodically monitor the changes in user's speech formants and vocal tract. The present disclosure may include intelligently deciding no need for voiceprint update, a need for a parametric/distribution update of a voiceprint without interaction with the user, or a need for explicitly requesting the user to update the voiceprint through voice recording when warranted based on a specific statistical distance criteria and thresholds.

The present disclosure may enable a voiceprint to be kept up to date, and would save the hassle for the user to remember to refresh their voiceprint since the parametric and distribution push based updates contemplated herein may be sufficient to account for vocal drift of the occupant. The present disclosure may include acoustic features with high discrimination power (e.g., formants, spectrogram, Mel-frequency cepstral coefficients (MFCCs), etc.) which may be extracted for the user's acoustic utterances based within a calibratable time window. A voiceprint may be created for the first time based on the extracted acoustic features and stored in the voiceprint data based as part of the user's personalized profile. The present disclosure may rely upon a voiceprint probability distribution (e.g., Laplacian distribution (LD), Gaussian distribution (GD), generalized GD, and gamma distribution) to represent a created voiceprint. A statistical distance-based voiceprint drift detection process (e.g., Population Stability Index, Kullback-Leiber or KL Divergence, Jenson-Shannon or JS Divergence, Kolmogorov-Smirnov Test or KS Test, Wasserstein Metric) may be employed to measure and use as a change/drift indicator exceeds a certain calibratable change threshold, voiceprint update or rebuild is triggered. If the measured change exceeds a certain calibratable rebuild threshold, the user may be requested to start a new session to rebuild the voiceprint, otherwise the voiceprint may be automatically updated by adapting the parameters of the voice probability distribution.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term "about" whether or not "about" actually appears before the numerical value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A method for in-vehicle voiceprint drift detection, comprising determining an archived voiceprint for an operator of a vehicle;
   generating a real-time voiceprint for the operator according to in-vehicle utterances made by the operator while operating the vehicle;
   generating a voiceprint deviation to probabilistically quantify drift between the real-time and archived voiceprints, the drift reflecting statistical distance between one or more probabilistic density functions associated with each of the real-time and archived voiceprints;
   generating a rebuilt voiceprint in response to the voiceprint deviation surpassing a rebuild threshold;
   replacing the archived voiceprint with the rebuilt voiceprint in response to the voiceprint deviation surpassing the rebuild threshold; and
   generating an updated voiceprint in response to the voiceprint deviation surpassing an update threshold, the update threshold being less than the rebuild threshold.

2. The method according to claim 1, further comprising:
   performing an update process to generate the updated voiceprint, the update process generating the updated voiceprint according to one or more adjustments made to the archived voiceprint.

3. The method according to claim 1, further comprising:
   performing an update process to generate the updated voiceprint by statistically altering the archived voiceprint.

4. The method according to claim 1, further comprising:
   performing an update process to generate the updated voiceprint by altering one or more of vocal characteristics of the archived voiceprint.

5. The method according to claim 4, further comprising:
   the vocal characteristics including one or more of pitch, intensity, amplitude, formants, spectrogram, Mel-fre-quency cepstral coefficients (MFCCs), timing, timbre, accent, dialect, and intonation.

6. The method according to claim 1, further comprising:
   performing a rebuild process to generate the rebuilt voiceprint according to test utterances made by the operator as part of a verbal test.

7. The method according to claim 1, further comprising:
   performing a rebuild process to generate the rebuilt voiceprint according to a combination of words spoken by the operator and recorded with an acoustics module onboard the vehicle.

8. A system for in-vehicle voiceprint drift detection, comprising
   an acoustics module configured for:
      controlling one or more operations of a vehicle according to in-vehicle utterances of an operator made while operating the vehicle; and
   a voiceprint module configured for:
      generating a real-time voiceprint according to the in-vehicle utterances;
      generating a voiceprint deviation to probabilistically quantify drift between the real-time voiceprint and an archived voiceprint previously generated for the operator;
      updating one or more vocal characteristics of the archived voiceprint to generate an updated voiceprint in response to the voiceprint deviation surpassing an update threshold; and
      replacing the archived voiceprint with a rebuilt voiceprint in response to the voiceprint deviation surpassing a rebuild threshold, the update threshold being less than the rebuild threshold.

9. The system according to claim 8, wherein:
   the voiceprint module is configured for:
      updating the vocal characteristics according to a statistical process whereby the updated voiceprint is generated by statistically altering the archived voiceprint in proportion to the voiceprint deviation.

10. The system according to claim 9, wherein:
   the vocal characteristics include one or more of pitch, intensity, amplitudes, formants, spectrogram, Mel-frequency cepstral coefficients (MFCCs), timing, timbre, accent, dialect, and intonation.

11. The system according to claim 8, wherein:
   the voiceprint module is configured for:
      generating an archived probability distribution to model vocal-tract frequency spectra for the archived voiceprint;
      generating a real-time probability distribution to model vocal-tract frequency spectra for the real-time voiceprint; and
      generating the voiceprint deviation according to differences between the archived and real-time probability distributions.

12. The system according to claim 8, wherein:
   the drift reflects statistical distance between one or more probabilistic density functions associated with each of the real-time and archived voiceprints.

13. The system according to claim 8, wherein:
   the acoustics module is onboard the vehicle; and
   the voiceprint module is offboard the vehicle at a back office controller.

14. The system according to claim 8, wherein:
   the voiceprint module is configured for generating the rebuilt voiceprint according to test utterances made by the operator in response to a plurality of verbal test questions.

15. A voiceprint module for in-vehicle voiceprint drift detection, the module configured for:

determining an archived voiceprint for an operator of a vehicle;

generating a first real-time voiceprint according to in-vehicle utterances of the operator made while operating the vehicle;

generating a first voiceprint deviation to quantify statistical distance between one or more probabilistic density functions associated with each of the first real-time and archived voiceprints; and updating one or more vocal characteristics of the archived voiceprint to generate an updated voiceprint in response to the first voiceprint deviation surpassing an update threshold; and replacing the archived voiceprint with a rebuilt voiceprint in response to the first voiceprint deviation surpassing a rebuild threshold, the update threshold being less than the rebuild threshold.

16. The voiceprint module according to claim 15, further configured for:

updating the vocal characteristics according to a statistical process whereby the updated voiceprint is generated by statistically altering the archived voiceprint in proportion to the first voiceprint deviation.

17. The voiceprint module according to claim 15, further configured for:

generating a second real-time voiceprint according to further in-vehicle utterances of the operator made while operating the vehicle;

generating a second voiceprint deviation to quantify statistical distance between one or more probabilistic density functions associated with each of the updated and second real-time voiceprints; and generating the rebuilt voiceprint in response to the second voiceprint deviation surpassing a rebuild threshold.

18. The voiceprint module according to claim 17, further configured for:

generating the rebuilt voiceprint according to test utterances made by the operator in response to a plurality of verbal test questions.

19. The voiceprint module according to claim 18, further configured for:

generating the updated voiceprint without performing the verbal test.

20. The voiceprint module according to claim 15, wherein:

the vocal characteristics include one or more of pitch, intensity, amplitudes, formants, spectrogram, Mel-frequency cepstral coefficients (MFCCs), timing, timbre, accent, dialect, and intonation.

\* \* \* \* \*